No. 616,749. Patented Dec. 27, 1898.
C. H. THURSTON.
BICYCLE SUPPORT.
(Application filed Oct. 18, 1897.)
(No Model.)
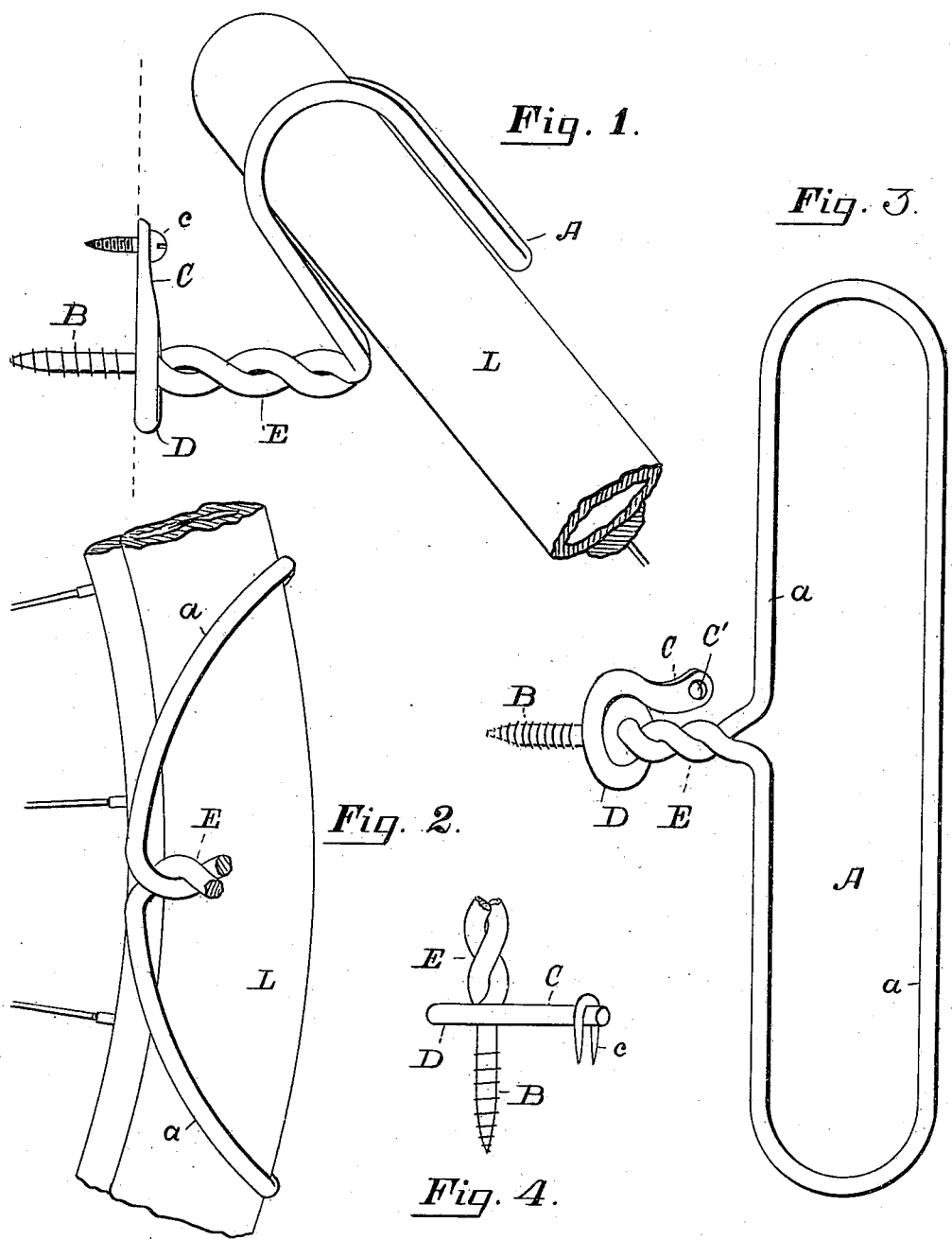
Witnesses:
F. E. Cutler
Jeannette Soule
Inventor,
Charles H. Thurston,
By A. B. Upham,
Attorney.
THE NORRIS PETERS CO., PHOTO-LITHO., WASHINGTON, D. C.

UNITED STATES PATENT OFFICE.

CHARLES H. THURSTON, OF WORCESTER, MASSACHUSETTS.

BICYCLE-SUPPORT.

SPECIFICATION forming part of Letters Patent No. 616,749, dated December 27, 1898.

Application filed October 18, 1897. Serial No. 655,553. (No model.)

*To all whom it may concern:*

Be it known that I, CHARLES H. THURSTON, a citizen of the United States, residing at Worcester, in the county of Worcester and State of Massachusetts, have invented a new and useful Bicycle-Support, of which the following is a full, clear, and exact description.

The object of this invention is the construction of an improved device adapted to be secured to a fence, partition, or similar structure whereby a bicycle can be supported in a vertical position when not in use.

My device comprises, essentially, a limited section of rack provided with a rotatively-adjustable means of attachment to the desired fixed support, and it is preferably formed from a single length of heavy wire bent and shaped as illustrated in the drawings forming part of this specification, and in which—

Figure 1 is a plan view of the support, showing a portion of a bicycle-wheel held therein. Fig. 2 is a side elevation of the same with a part of the sustaining-shank broken off. Fig. 3 is an elevation of the support in a plane at right angles to the showing in Fig. 2, but with the rack uncurved or flattened; and Fig. 4 is a detail view of a modified form of the securing-arm.

The rack A itself is formed by bending the wire into the elongated loop having parallel sides $a$, as shown in Fig. 3, then twisting the wire together into a shank E and shaping one terminal into the gimlet-pointed screw B. The other wire end is coiled into a shoulder D and then bent out radially therefrom to serve as a securing-arm C.

When the sides $a$ of the rack are straight, as shown in Fig. 3, a bicycle-wheel will not enter the same far enough to be securely held. I therefore curve the rack centrally outward, as shown in Fig. 2, and thereby bring the sides $a$ into complete contact with the central portion of the bicycle-tire. This curvature not only insures ample engagement of a wheel with the rack, but in addition enables the rack to be adjusted to accommodate tires of different sizes. This latter feature is obtained by simply bending the outwardly-curved sides $a$ of the rack nearer together or farther apart until the distance between the same will suitably fit the tire which it is desired to place therein.

As shown in Fig. 1, the rack is bent at an angle of approximately forty-five degrees with respect to the shank E in order that the bicycle supported thereby shall stand oblique to the wall or partition in which the screw B is inserted. By thus having the bicycle stand at an oblique angle it will not extend out into the room as far as it would if at right angles to the wall. Furthermore, this enables the shank E to be shorter than it would require to be were the rack bent entirely back parallel with the shank, for in the latter case the bicycle-wheel would strike the wall before it had entered the rack far enough to be securely held.

It will be noticed that whereas the drawings show the bicycle extending outwardly from the wall toward the left it can as easily be made to extend toward the right by simply rotating the rack through an arc of one hundred and eighty degrees upon the screw as an axis.

To hold the rack firmly in whichever position it is desired that it should be retained, a screw or nail $c$ is inserted through the eye C' of the arm C into the wall holding the rack; or, in case it is not wished to form an eye in said arm, a staple may be driven into the wall and made to straddle said arm, as shown in Fig. 4.

The arm C is a very important feature of the fastening device for the rack, for without it there would be nothing to prevent the screw from soon becoming loose, when the rack would turn and let the bicycle held thereby fall prone upon the floor.

What I claim as my invention, and desire to secure by Letters Patent, is as follows, to wit:

1. In a bicycle-support, the single length of wire bent into the substantially elliptical loop adapted to receive a bicycle-wheel, the wire being brought together at one side of the loop and twisted together to form a shank, said shank being bent at an oblique angle to the surface coincident with said loop to enable the bicycle supported thereby to stand out obliquely to the wall to which the support is secured, and one of the wire ends being converted into a screw and the other end being coiled about the base of such screw end, substantially as and for the purpose specified.

2. In a bicycle-support, the single length of wire bent into the substantially elliptical loop to act as the wheel-receiver, and having its ends twisted together to form a shank at the center of one side of the loop, one of said ends being extended and converted into a screw, and the other end coiled about the base of such screw and extended radially therefrom, in combination with means for fastening said radial end to the base into which said screw end has been inserted, and the latter thereby prevented from unscrewing.

3. The single length of wire bent into a supporting device and having one end converted into a screw, the other end being coiled about the base of such screw and extended radially therefrom and terminating in an eye, in combination with a body adapted to enter said eye and be fixed in the base into which said screw end has been inserted, whereby the latter is prevented from unscrewing.

In testimony that I claim the foregoing invention I have hereunto set my hand and seal this 7th day of August, in the year 1897.

CHARLES H. THURSTON. [L. S.]

Witnesses:
FRED A. NICHOLS,
J. HOWARD ADAMS.